United States Patent
Bramlett

[19]

[11] Patent Number: 6,158,137
[45] Date of Patent: Dec. 12, 2000

[54] CENTER LOCATOR TOOL

[76] Inventor: James E. Bramlett, 10 Yale Rd., Parlin, N.J. 08859

[21] Appl. No.: 09/189,861

[22] Filed: Nov. 12, 1998

[51] Int. Cl.[7] .................................................. G01D 21/00
[52] U.S. Cl. ...................... 33/520; 33/27.03; 33/27.032; 33/671; 33/675
[58] Field of Search .............................. 33/27.03, 27.031, 33/27.032, 27.033, 520, 666, 670, 671, 672, 673, 675, 676

[56] References Cited

U.S. PATENT DOCUMENTS

| | | | |
|---|---|---|---|
| 578,196 | 4/1897 | Beck | 33/675 |
| 794,170 | 7/1905 | Fessler | 33/675 |
| 1,038,729 | 9/1912 | Dénes | 33/520 |
| 1,153,149 | 9/1915 | Abbott | 33/520 |
| 1,166,968 | 1/1916 | Carter | 33/42 |
| 1,187,658 | 6/1916 | Sauerhering | 33/675 |
| 1,215,441 | 2/1917 | Walker | 235/70 A |
| 1,225,265 | 5/1917 | Miller | 33/676 |
| 1,274,647 | 8/1918 | Whipple | 33/675 |
| 1,398,871 | 11/1921 | Livingston | 33/675 |
| 1,703,736 | 2/1929 | Jacob | 33/520 |
| 2,559,280 | 7/1951 | Cochran | 33/520 |
| 2,599,819 | 6/1952 | Fisher | 33/520 |
| 2,842,860 | 7/1958 | Gray | 33/667 |
| 2,928,178 | 3/1960 | Wilcox | 33/27.08 |
| 3,025,609 | 3/1962 | Hendrix | 33/675 |
| 3,137,947 | 6/1964 | Flower | 33/675 |
| 3,162,958 | 12/1964 | Miehls | 33/676 |
| 3,583,823 | 6/1971 | Eaton | 408/115 R |
| 3,628,253 | 12/1971 | Shepard | 33/578 |
| 4,084,325 | 4/1978 | Jones, Jr. | 33/670 |
| 4,291,468 | 9/1981 | Follett | 33/520 |
| 4,326,339 | 4/1982 | Marino | 33/520 |
| 4,402,576 | 9/1983 | Stahl et al. | 359/393 |
| 4,416,063 | 11/1983 | Nestor et al. | 33/810 |
| 4,447,956 | 5/1984 | Chung | 33/520 |
| 5,437,105 | 8/1995 | Work | 33/644 |
| 5,778,949 | 7/1998 | Draves | 33/27.032 |
| 6,029,362 | 2/2000 | Miodragovic | 33/666 |

FOREIGN PATENT DOCUMENTS

| | | | |
|---|---|---|---|
| 2425625 | 12/1979 | France | 33/520 |
| 2093753 | 9/1982 | United Kingdom | 33/520 |

*Primary Examiner*—Diego Gutierrez
*Assistant Examiner*—Stanley J. Pruchnic, Jr.
*Attorney, Agent, or Firm*—Richard C. Litman

[57] ABSTRACT

The center locator tool has a flat, rectangular case with a top wall, a bottom wall, and two opposing side walls. The interior of the case houses a spur gear rotatably mounted on a center post extending through the center of the case, the center post having a bore defined axially therein. A pair of arms are mounted so that the arms are slidable through the case on opposite sides of the spur gear, each arm having a rack defined in its edge which engages the spur gear so that when one arm is extended from the case, the other arm is extended an equal distance in the opposite direction. Each arm has a groove defined in its bottom surface for engaging a guide projecting from the bottom wall of the case. The end of each arm has a work engaging plate forming a "V" shape, the opening of the "V" facing towards the center of the tool, the plates depending from the ends of the arms and being adapted for engaging a square or circular workpiece. When the "V" plates engage the diagonally opposing corners of a square or opposite sides of a circle, the center of the surface lies below the bore defined in the center post. An alternative embodiment of the tool has a wheel with an O-ring about its circumference frictionally engaging slots defined in the edges of the arms in place of the spur gear and rack mechanism.

17 Claims, 6 Drawing Sheets

CENTER LOCATOR TOOL

BACKGROUND OF THE INVENTION

1. Field of the Invention

The present invention relates to tools used in carpentry and in machine work, and particularly to devices for locating the center of surfaces such as squares, circles, etc., as well as for drawing a circle on a surface.

2. Description of the Related Art

It is frequently desirable to locate the center of a surface, for example, in order to center a knob on the square or rectangular face of a drawer front, or in order to punch a hole through the center of a circle made from sheet metal. It is possible to locate the center of such geometric surfaces by making a series of measurements with rulers and dividers, performing a series of arithmetical calculations, and subsequently laying out the required distance with rulers and dividers or compasses and protractors to locate and mark the desired point. However, such methods may not produce an acceptable degree of precision and accuracy, since there may be a number of measurements required, and some degree of error associated with each measurement. In addition, the process can be inconvenient and burdensome, particularly when it must be done repetitively.

It is therefore desirable to have a tool which may be applied to a work surface in order to mark the center of the surface directly without the need for repetitive measurements and calculations. The present invention provides a device for locating the center of circles, squares, rectangles, straight lines, and other surfaces by means of extensible arms operatively connected by a rack and spur gear arrangement. The device may also be used to make measurements, and to draw circles.

A variety of devices have been developed for locating the center of a surface directly without the necessity for performing multiple measurements, reading a scale, or performing calculations. Several devices employ a pair of moveable arms connected by a rack and pinion mechanism. U.S. Pat. No. 794,170, issued Jul. 11, 1905 to J. W. Fessler, describes two strips slidable in opposite directions connected by a pinion, each strip having a jaw at each end of the strip and the pinion having a hole through its axis adapted for receiving a center punch. The device is used for locating center lines. U.S. Pat. No. 1,038,729, issued Sep. 17, 1912 to A. Denes, teaches a tool for finding the center of a circle, the tool having a frame with two pins depending from one end of the frame, a slide mounted on the frame, the slide having a center hole and being connected to a center strip mounted in a slot on the frame and having a least one pin depending from the slide, and a pair of concentric pinions, one engaging a rack on the frame and the other engaging a rack on the center strip. The device is placed on the circle with the three pins abutting the circumference of the circle, the center of the circle being located at the center hole. The device does not locate the center of squares or rectangles.

U.S. Pat. No. 2,599,819, issued Jun. 10, 1952 to S. Fisher, shows a center gage having a base with a gear in the center of the base, two moveable arms having racks defined therein disposed in the base on opposite sides of the gear, work engaging blocks at the ends of the arms, a center hole through the hub of the gear, and a thumbscrew mounted above one of the arms to lock the gear in place. U.S. Pat. No. 2,842,860, issued Jul. 15, 1958 to E. C. Gray, describes a device to center drawer knobs or handles including a bracket for hanging the device from the top edge of a drawer front, three vertical strips with spaced apart holes defined therein, a spur gear mounted to the center of the three strips, and two moveable arms having racks engaging the spur gear, the moveable arms engaging opposite sides of the drawer front. The device essentially only locates the vertical center line of the drawer front.

U.S. Pat. No. 3,628,253, issued Dec. 21, 1971 to W. D. Shepard, teaches a device for marking the center of doorways and other portals having a frame with two slidable members having racks driven by a crank with a main gear and two pinions, the slidable members having marker members with reservoirs for dyes or inks. The doorway is measured, the center of the frame is nailed to the center of the doorway, the crank extends the arms to the edges of the doorways, and a mark is made by pressing down on the marking members. A drawing tool for marking centers on layouts, particularly for use by lithographers, is described in U.S. Pat. No. 3,137,947, issued Jun. 23, 1964 to B. Flower. The device has frame enclosing a pair of movable arms with depending legs, the arms connected by a rack and pinion mechanism, and a pen disposed between the legs.

Devices which use a pair of movable arms connected by a pulley and flexible, continuous loop member include U.S. Pat. No. 3,583,823, issued Jun. 8, 1971 to M. R. Eaton, U.S. Pat. No. 2,928,178, issued Mar. 15, 1960 to S. W. Wilcox, U.S. Pat. No. 4,291,468, issued Sep. 29, 1981 to E. C. Follett, and U.S. Pat. No. 4,326,339, issued Apr. 27, 1982 to C. Marino. Devices to find the center of circles, annular rings, and other round objects are disclosed in U.S. Pat. No. 1,153,149, issued Sep. 7, 1915 to P. Abbott, French Patent No. 7,813,611, published Dec. 7, 1979, and United Kingdom Patent No. 2,093,753, published Sep. 8, 1982.

Other devices include U.S. Pat. No. 1,166,968, issued Jan. 4, 1916 to J. E. Carter (screw with threads in opposite directions); U.S. Pat. No. 1,215,441, issued Feb. 13, 1917 to M. S. Walker (sliding rule for centering headings on typewriters); U.S. Pat. No. 1,703,736, issued Feb. 26, 1929 to A. P. Jacob (beam caliper with rack and pinion mechanism); U.S. Pat. No. 2,559,280, issued Jul. 3, 1951 to H. C. Cochran (arms moved by traverse rod); and U.S. Pat. No. 5,437,105, issued Aug. 1, 1995 to R. H. Work (two crossed arms slidable in two brackets).

None of the above inventions and patents, taken either singularly or in combination, is seen to describe the instant invention as claimed. Thus a center locator tool solving the aforementioned problems is desired.

SUMMARY OF THE INVENTION

The center locator tool has a flat, rectangular case with a top wall, a bottom wall, and two opposing side walls. The interior of the case houses a spur gear rotatably mounted on a center post extending through the center of the case, the center post having a bore defined axially therein. A pair of arms are mounted so that the arms are slidable through the case on opposite sides of the spur gear, each arm having a rack defined in its edge which engages the spur gear so that when one arm is extended from the case, the other arm is extended an equal distance in the opposite direction. Each arm has a groove defined in its bottom surface for engaging a guide projecting from the bottom wall of the case. The end of each arm has work engaging plate forming a "V" shape, the opening of the "V" facing towards the center of the tool, the plates depending from the ends of the arms and being adapted for engaging a square or circular workpiece. When the "V" plates engage the diagonally opposing corners of a square or opposite sides of a circle, the center of the surface lies below the bore defined in the center post.

The tool has a thumbscrew threadably engaging the center post. The thumbscrew may be used to lock the arms when the center of the surface is located. The arms are graduated, bearing indicia indicating length, so that the tool may be placed in the interior of a closed workpiece, the arms extended to the sides of the workpiece, the thumbwheel locked, and the measurement taken. A center punch may be threaded to the center post. The center punch includes a spring biased punch mounted in a tube operated by pressing or punching a striker plate to mark the center of a surface. The ends of the arms are notched, so that the tool may be used to draw a circle of fixed radius by holding down the center punch, inserting a pen or scribe in the notch, and rotating the tool to inscribe a circle.

The tool may be used to locate the center of rectangular surfaces by use of a wedge attachment. The wedge attachment may be attached to fill the "V" at the ends of the arms, the wedges having notches in the center of their leading edges for engaging the corners of a rectangular workpiece. The tool also includes an adaptor for locating the center of workpieces shorter than the width of the case.

Accordingly, it is a principal object of the invention to provide an improved center locator tool for locating the center of square, circular and rectangular surfaces without the necessity of making repeated measurements or making calculations by means of a tool having extensible arms synchronized by gearing and having a fixed center hole.

It is another object of the invention to provided a center locator tool having improved precision in the form of extensible arms guided by grooves in the bottom surfaces of the arms which slidably engage guides on the bottom wall of the tool's case, and by improved gearing to prevent lateral movement of the tool arms incidental to engagement of the spur gear with the racks defined in the arms.

It is a further object of the invention to provide a center locator tool which may be used to locate the centers of workpieces defined by two opposing walls, such as the inside of a box or the center line between two beams, by a center locator tool having two extensible arms slidable rectilinearly and in synchronization from a fixed center.

Still another object of the invention is to provide a center locator tool in which the center of a square, circular, or rectangular surface may either be measured by locking two extensible arms with a thumbwheel fixed, or marked by inserting a center punch at the center of the tool.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
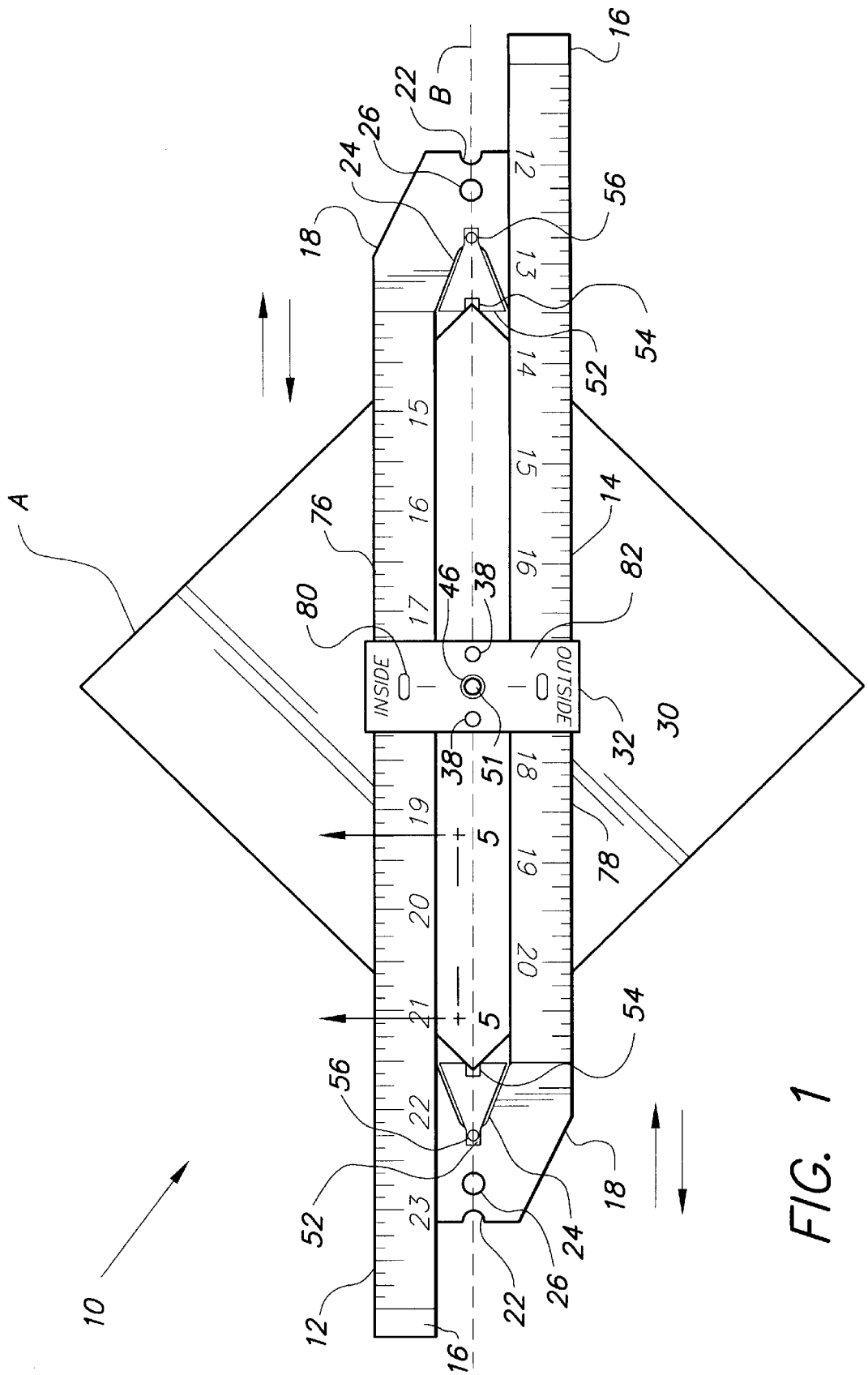
FIG. 1 is an environmental, plan view of a center locator tool according to the present invention.

The present invention is a center locator tool, designated generally as 10 in FIGS. 1 through 5. The tool 10 is shown in use for locating the center of a square workpiece A in FIG. 1. The tool 10 comprises a pair of arms 12 and 14 slidable through a rectangular case 30. Each of the arms 12 and 14 comprises an extended, flat, rectangular bar. At one end, the bar has a raised stop 16 extending transversely across the top surface of the bar. The stops 16 limit the travel of the arms 12 and 14 through the case 30, being adapted to engage the edge or the top wall 32 of the case 30.

The other ends of the arms 12 and 14 have a work engaging plate 18 extending perpendicularly from the arms 12 and 14. As shown more clearly in FIG. 2, the work engaging plates 18 depend from the ends of the arms 12 and 14 in stepwise fashion, being connected by a short riser 20 having a length approximately equal to the thickness of the arms 12 and 14, so that the work engaging plates 18 lie in a horizontal plane below that of the arms 12 and 14. Each work engaging plate 18 has a notch 22 defined in its outer edge adapted for receiving a scribe or the nib of a pen or pencil, whose function is described later, the notches 22 being symmetrical about a center line B extending longitudinally through the center of the tool 10. The inner edge of the work engaging plates 18 each have a "V" shaped recess 24 defined therein, the opening of the "V" facing towards the center of the tool 10, the "V" being symmetrical about the center line B and defining an angle θ measuring 90°. Each work engaging plate 18 also includes a hole 26 defined therein, which may be used for hanging the tool 10 on a wall mounted hook when not in use.

Figure 4:
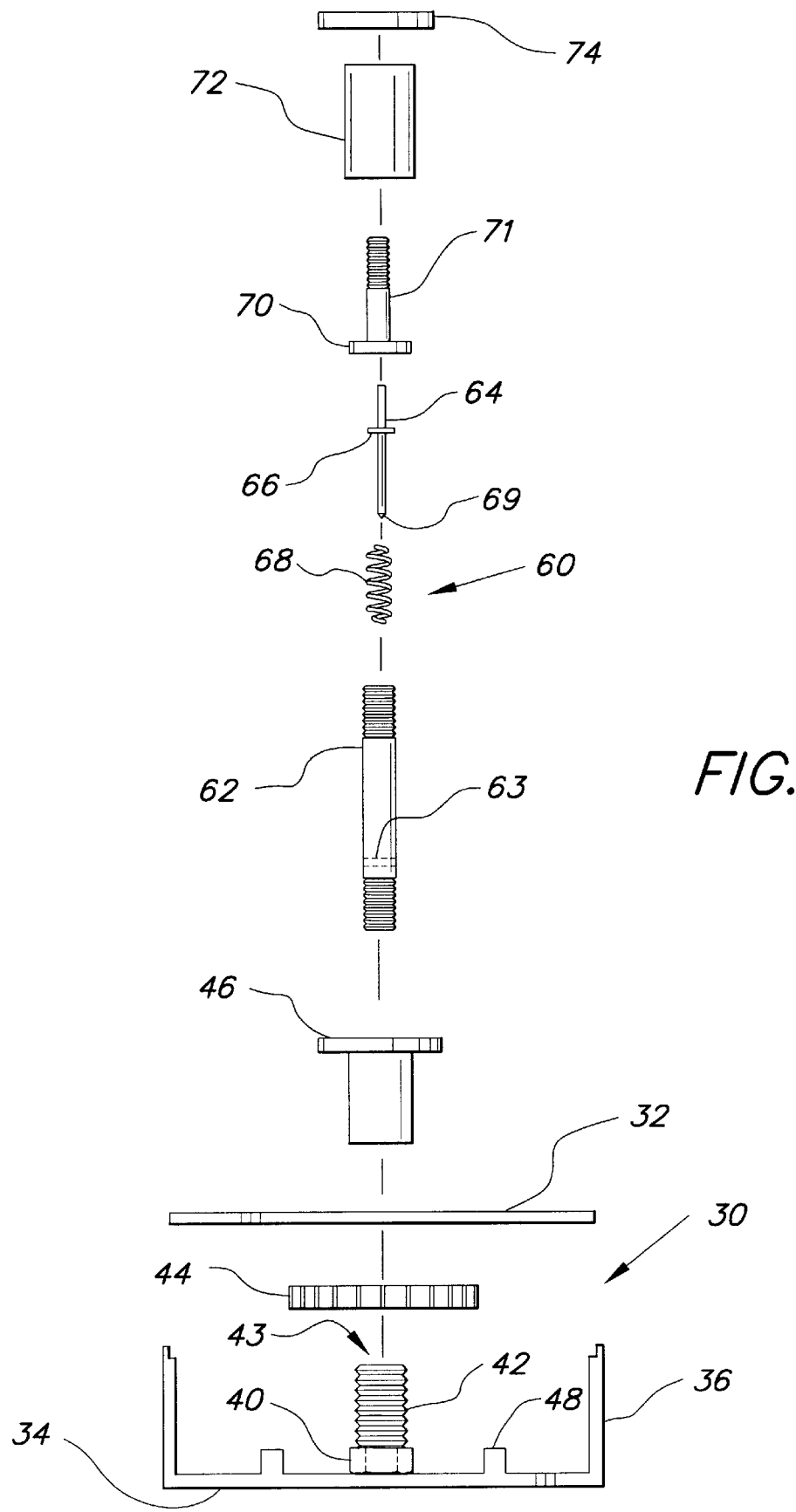
FIG. 4 is an exploded view of the center punch and case of the center locator tool according to the present invention.

The case 30 is shown in more detail in FIG. 4. The case 30 is generally flat and rectangular, having a top wall 32, a bottom wall 34, and two opposing side walls 36. The top wall 32 is secured to the bottom wall by a pair of Allen head screws 38 or other fasteners, which engage threaded holes defined in screw pads 40 at opposite ends of the bottom wall 34. A center post 42 having a bore 43 defined axially therein is mounted in the center of the bottom wall 34 and extends to the top wall 32. A spur gear 44 is rotatably mounted on the center post 42. The spur gear 44 may optionally be mounted with nylon washers on opposite sides. The tool 10 includes a thumbwheel 46 having a bore 51 defined axially therein, the thumbwheel being inserted through a hole in the top wall 32 and engaging external threads on the upper portion of the center post 42, the bores 51 and 43 being axially aligned. The thumbwheel 46 is so disposed that the spur gear 44 may be locked in place and prevented from further rotation by threading the thumbwheel 46 onto the center post 42 far enough to compress the gear against the bottom wall 34 of the case 30.

Figure 3:
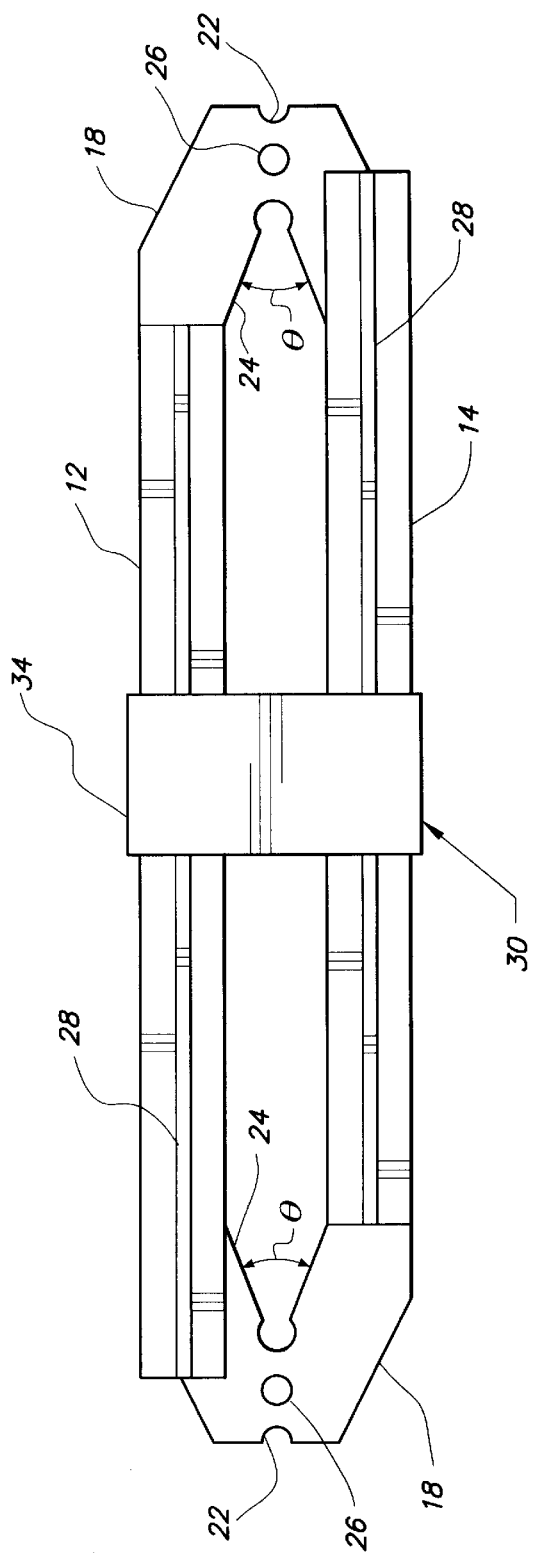
FIG. 3 is a bottom, elevational view of a center locator tool according to the present invention.
Figure 5:
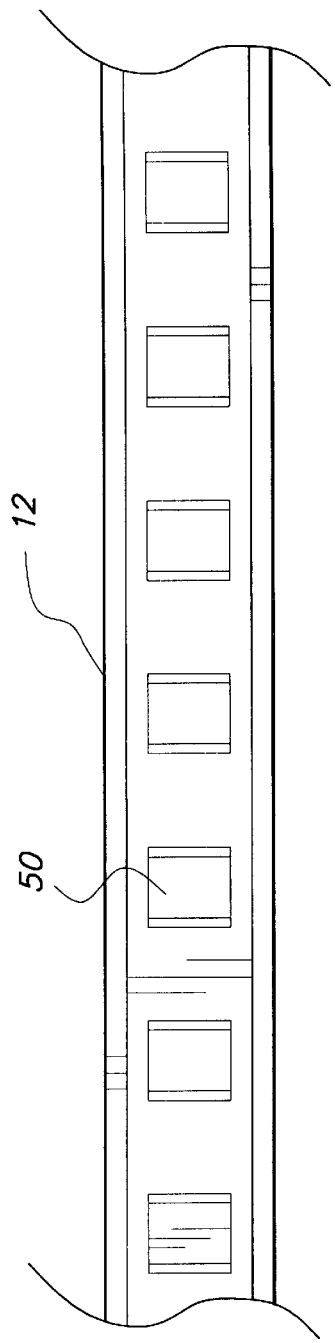
FIG. 5 is a section view along the line 5—5 of FIG. 1 showing a portion of the rack machined into the edge an arm of the center locator tool according to the present invention.

As shown in FIG. 3, the bottom surfaces of each arm 12 and 14 has a guide slot or groove 28 defined therein extending longitudinally for the length of the arm 12 and 14, respectively. The guide slots 28 slidably engage guide ridges 48 projecting from the bottom wall 34 of the case 30 and extending transversely across the width of the case 30 in parallel spaced relation on opposite sides of the center post 42. Each of the arms 12 and 14 has a rack 50 of gear teeth machined into the edge of the arm 12 and 14 facing the center line B of the tool 10, as shown with respect to the arm 12 in FIG. 5. The teeth of each rack 50 are not visible when the tool 10 is viewed from the top or bottom (see FIGS. 1 and 3), but are recessed into the edge of each arm 12 and 14 respectively. The arms 12 and 14 are disposed in parallel spaced relation at least partially in the case 30 on diametrically opposite sides of the spur gear 44, the teeth of the spur gear 44 engaging the racks 50 defined in arms 12 and 14 respectively, so that when one of the arms 12 and 14 is extended through the case 30, the other arm 12 or 14 is e)tended an equal distance in the opposite direction.

The tool 10 as described thus far may be used to locate the center of a square or circular workpiece in the following manner. The tool 10 is placed on top of the workpiece. The thumbwheel 46 is loosened and holding the case 30 with one hand, one of the arms 12 or 14 is extended or retracted to engage a corner of the square with the "V" 24 defined in the work engaging plate 18 at the end of the arm 12 or 14, the "V" 24 defined in the other arm 12 or 14 being positioned to engage the diagonally opposite corner of the square A. With the "V" shape 24 of plates 18 snugly engaging diagonally opposite corners of the square A, the thumbwheel 46 is locked and the center of the square workpiece A is located directly below the bore 43 defined in the center post 42. The use of the tool 10 to locate the center of a circle is similar, the "V" 24 shaped plates 18 being positioned on diametrically opposite sides of the circular workpiece.

The tool 10 may be used to find the center of rectangular or square workpieces with the addition of the wedge attachment 52 shown in FIG. 1. The wedge attachment 52 is a triangular shaped flat plate adapted for filling the "V" 24, so that two of its sides abut and snugly engage the opening of the "V" 24 in the work engaging plates 18, the third side extending across the open mouth of the "V" 24 and having a notch 54 defined therein bisecting the third side. The wedge attachment 52 is attached to the work engaging plate 18 by means of a small set screw 56. In order to locate the center of a rectangular work piece or a square workpiece, the tool 10 is placed on the workpiece, and the arms 12 and 14 are manipulated to engage diagonally opposite corners of the rectangle or square in the notches 54, the center of the workpiece lying directly below the bore 43. It is contemplated that the wedge attachment 52 will normally be left in place on the tool 10, it being more commonly necessary to locate the center of squares and rectangles, the wedge attachment 52 being removed to locate the center of circular workpieces. It will be understood that although the notch 54 is shown in the drawings as rectangular, it may be defined in other shapes, e.g., square, rectangular, semicircular, V-shaped, etc., provided that the notch 54 is adapted for engaging both sides of the corner of a rectangular or square workpiece.

Figure 2:
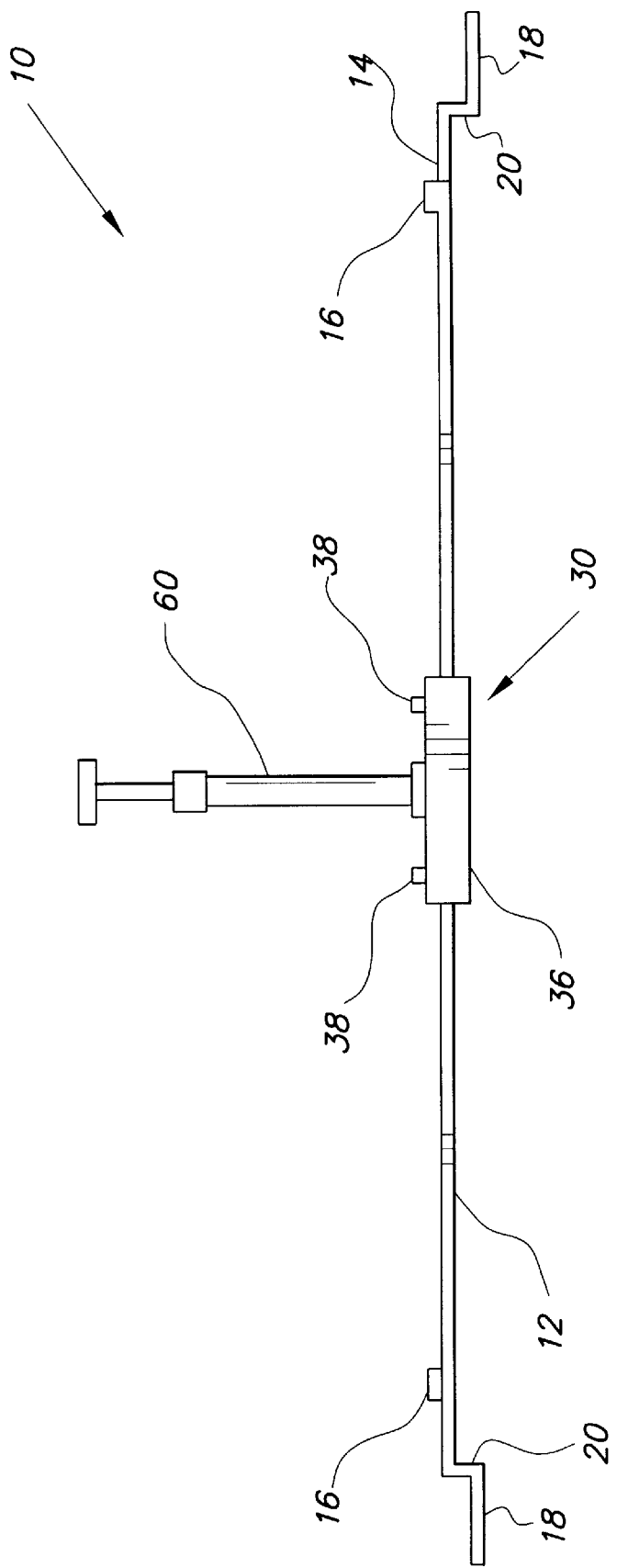
FIG. 2 is a lateral, elevational view of a center locator tool according to the present invention with a center punch attached

The functional utility of the tool 10 may be extended by the use of the center punch 60 shown in FIGS. 2 and 4. The bore 43 defined in the center post 42 is threaded for about one half its length. The center punch 60 is attached to the tool 10 by means of a hollow tubular case 62 which is threaded at one end, being adapted to engage the internal threads of the center post 42. The center punch 60 may be operated by any conventional mechanism. In the version shown in FIG. 4, the case 62 houses a punch bar 64 having an annular flange 66 about its circumference and a pointed tip end 69. A helical spring 68 is disposed about the lower portion of the punch bar 64 between the flange 66 and a second annular flange 63 disposed inside the case 62 at its base. A striker 70 having a stem 71 inserted through a hole in the top of a cap 72 and threads into a striker plate 74. The cap 72 threads onto the top of the case 62. Thus the punch bar 64 is normally biased in an up position by the spring 68. When the center of a surface is located and the arms 12 and 14 are locked in position, the center may be marked by rapping on the striker plate with a hammer, compressing the spring 68 as the pointed tip 69 of the punch bar 64 marks the center of the surface, followed by return of the spring 68 to raise the punch bar 64.

The center punch 60 may also be used to draw a circle on a workpiece. The arms 12 and 14 are extended to the desired diameter and locked in place by the thumbwheel 46. The tool 10 is laid on the surface and the striker plate 74 is depressed and held to keep the tip of the punch bar 64 fixed at the desired center of the circle. A pen or scribe is inserted in the notch 22 at the end of one of the work engaging plates 18 and pressed against the workpiece as the pen or scribe is rotated using the center punch 60 as a pivot to inscribe the circle.

With the center punch 60 removed, the tool 10 may be also be used to draw a center line on a square or rectangular surface, such as a 2×4. The tool 10 is placed on the workpiece and the work engaging plates 18 are approximated to opposite sides of the workpiece. A marker is inserted through the bore 43 and the tool 10 is slid across the surface of the workpiece. The tool 10 may also be used to determine the inside dimensions of an enclosed object. The tool 10 is placed inside the enclosed object, the arms 12 and 14 are extended to the sides of the object, the thumbwheel 46 locks the arms in place, and the tool 10 is removed from the object. The arms 12 and 14 may be graduated and bear length indicia. For example, one arm 12 may bear indicia 76 corresponding to the length of an object measured from the inside of one work engaging plate 18 to the inside of the other work engaging plate 18, while the other arm 14 may bear indicia 78 corresponding to the length of an object measured from the outside of one work engaging plate 18 to the outside of the other work engaging plate 18. The case 30 may include a pair of openings or windows 80, together with indicia and a pointer 82 through which the corresponding measurement may be read.

Figure 6:
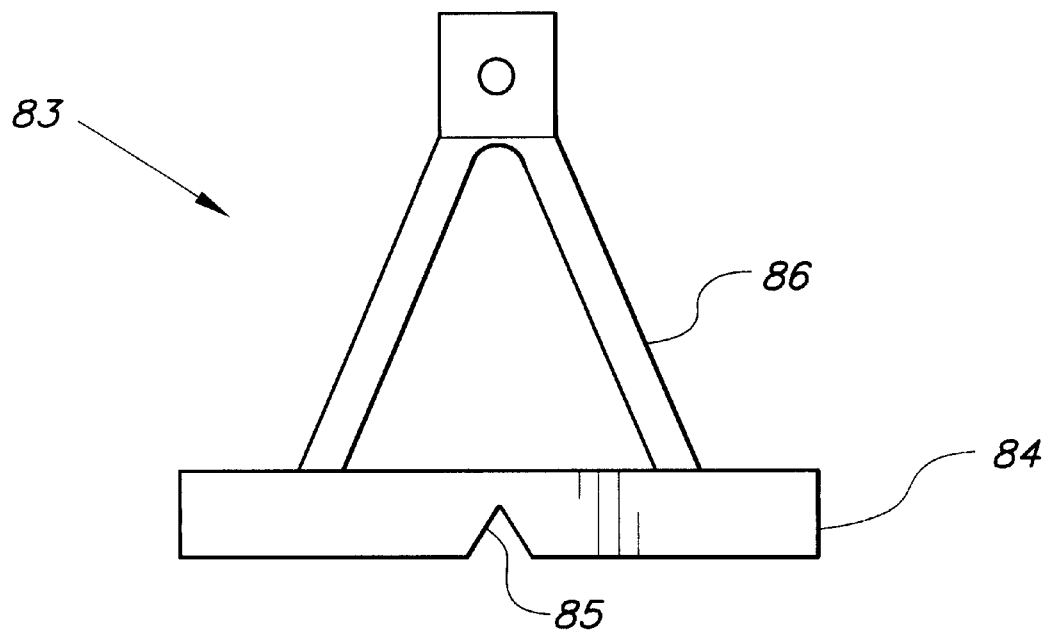
FIG. 6 is a plan view of an adapter for locating the center of small surfaces using the center locator tool according to the present invention.
Figure 7:
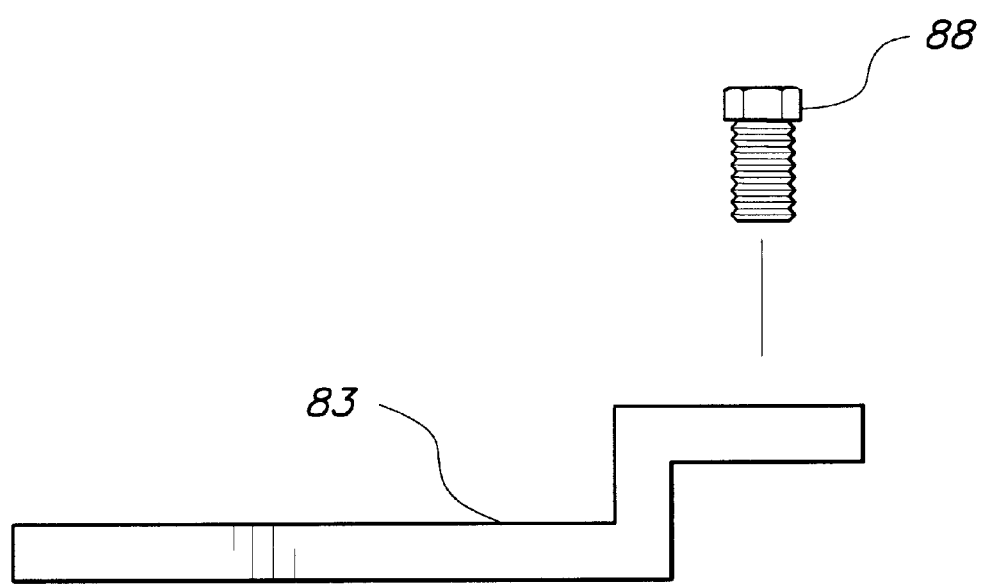
FIG. 7 is a lateral view of the adaptor shown in FIG. 6.

In the preferred embodiment, the arms 12 and 14 span a distance capable of accommodating a work piece length of about twenty four inches when fully extended and about one and one-half inches when fully retracted. The tool's 10 capabilities may be extended by use of the adapter 83 shown in FIGS. 6 and 7 to locate the center of smaller surfaces. The adapter 83 includes a small flat plate 84 having a notch 85 defined therein, the plate supported by a pair of struts 86. The adapter is attached to the tool 10 in lieu of the wedge attachment 52 by means of a set screw 88. The struts 86 extend the plate 84 sufficiently from the inner edge of the work engaging plates 18 towards the center of the tool 10 to engage small surfaces, enabling the tool 10 to locate the center of surfaces having a diagonal or diameter between about one-half inch to about one and one-half inches.

It will be seen that the center locator tool 10 of the present invention is capable of locating the center of square, rectangular and circular workpieces with precision. The tool 10 has guide ridges 48 engaging guide slots 28, which, in combination with machining the teeth of the racks 50 into the edges of the arms 12 and 14, maintain precise rectilinear movement of the arms. Without these improvements, the arms 12 and 14 might slide laterally or skew at an angle as the teeth of the racks 50 engage the teeth of the spur gear 44. This combination of features makes the center locator tool 10 a precision measuring instrument suitable for precise machining and woodworking. The center locator tool 10 is made from stainless steel, aluminum, or the like. The teeth of the spur gear 44 and the racks 50 are precisely milled, the precision of the tool 10 being dependent upon the number of teeth per inch.

Figure 8:
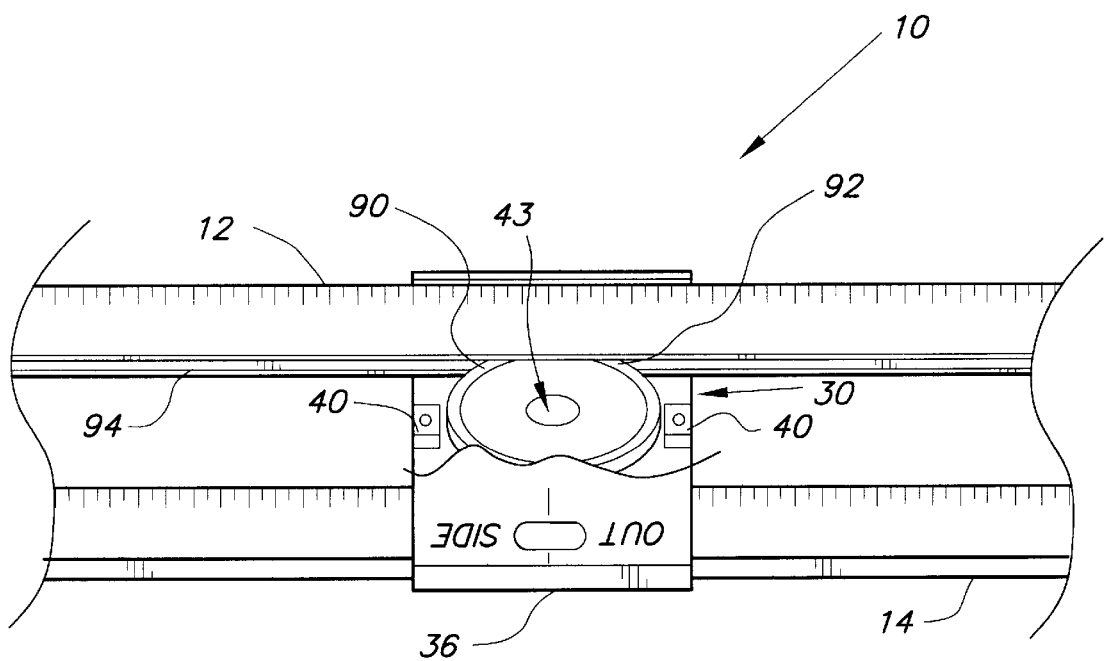
FIG. 8 shows a fragmented, perspective view of an alternative embodiment of the center locator tool according to the present invention with some parts omitted.

It will be obvious that with some modification an economical version of the center locator tool 10 may be made for general purpose use, e.g., as shown in FIG. 8, by substituting a wheel 90 with an O-ring 92 around its circumference frictionally engaging slots 94 defined in the edges of the arms 12 and 14. In this case the center locator tool 10 may be made from plastic.

It is to be understood that the present invention is not limited to the embodiments described above, but encompasses any and all embodiments within the scope of the following claims.

I claim:

1. A center locator tool for locating the center of a workpiece, comprising:
    a) a rectangular case having a top wall, a bottom wall, and two opposing side walls;
    b) a pair of flat, rectangular arms slidable through said case, each arm having an edge and a rack defined in the edge, the rack being recessed in the edge of the arm, and having a first end and a second end, the first end having a raised stop extending transversely across the arm for preventing the arm from sliding through said case, each arm further having a bottom surface and a guide slot defined in the bottom surface extending longitudinally for the length of the arm;
    c) work engaging means disposed at the second end of each of said arms for engaging a workpiece;
    d) a center post having a bore defined therein attached to the center of the bottom wall of said case and extending between the bottom wall and the top wall of the case, the center post being internally threaded and externally threaded about an upper portion;
    e) a spur gear rotatably disposed about said center post, the spur gear engaging the racks defined in said pair of arms, said arms being disposed in parallel spaced relation on opposite sides of the spur gear, so that when one of said arms is slidably extended through said case, the other said arm is slidably extended through said case in the opposite direction for an equal distance; and
    f) a thumbwheel having a bore defined axially therein, the thumbwheel being internally threaded and threadably engaging said center post, the bore defined in the thumbwheel being axially aligned with the bore defined in said center post, the thumbwheel being adapted for locking said pair of arms in a fixed position; and
    g) a pair of guide ridges projecting from the bottom wall of said case and extending transversely across the width of said case in parallel spaced relation on opposite sides of said center post, the guide ridges slidably engaging the guide slots in order to ensure said arms move rectilinearly without also moving laterally when they are extended through said case.

2. The center locator tool according to claim 1, further comprising a center punch removably engaging the bore defined in said center post.

3. The center locator tool according to claim 2, wherein said center punch comprises:

a) a tubular case having a base and having an annular flange disposed inside the tubular case at the base of the tubular case;
    b) a punch bar having an annular flange about its circumference and a pointed tip end;
    c) a helical spring disposed about said punch bar between the annular flange of said case and the annular flange of said punch bar, the spring biasing said punch bar in a normally up position;
    d) a cap threadably engaging said tubular case;
    e) a striker having a stem inserted through said cap, the striker being disposed within said tubular case above the punch bar; and
    f) a striker plate attached to the stem of said striker.

4. The center locator tool according to claim 1, wherein said work engaging means comprises:
    a) a work engaging plate integral with the second end of each of said arms, the work engaging plates extending perpendicular to said arms and depending from said arms so that the work engaging plates are disposed in a horizontal plane parallel to the plane of said arms, each work engaging plate having an inner edge facing said case and having an outer edge;
    b) a notch defined in the outer edge of each of said work engaging plates, the notches being adapted for receiving the nib of a pen;
    c) a V-shaped recess defined in the inner edge of each of said working plates, the open mouth of the V-shaped recess facing said case and being symmetrical about a center line extending longitudinally through the center of said center locator tool, the V-shaped recess measuring 90° and being adapted for engaging a corner of a square workpiece and being adapted for engaging an arc of a circular workpiece.

5. The center locator tool according to claim 4, further comprising a wedge attachment having a triangular shape removably attached to each of said work engaging plates, two sides of the wedge attachment abutting the V-shaped recess defined in the inner edge of said work engaging plate, the third side extending across the open mouth of the V-shaped recess and having a notch defines therein, the notch bisecting the third side of the wedge attachment, the notch being adapted for engaging a corner of square and rectangular workpieces.

6. The center locator tool according to claim 4, further comprising an extension adapter for measuring workpieces smaller than about one and one-half inches being removably attached to each of said work engaging plates, the adapter including a plate supported by a pair of struts, the plate having a notch defined therein adapted for engaging a corner of square and rectangular workpieces, the struts extending the plate from the inner edge of the work engaging plates towards the center of the tool in order to engage workpieces having diameters and diagonals between about one-half inch to about one and one-half inches.

7. The center locator tool according to claim 4, wherein:
    a) one of said arms includes indicia stamped thereon corresponding to the length of a workpiece measured from the outer edge of one of said arms to the outer edge of the other said arm, the other said arm having indicia stamped thereon corresponding to the length of a workpiece measured from the inner edge of one of said arms to the inner edge of the other said arm; and
    b) said case has a pair of windows, each window having an associated pointer and indicia stamped on said case, the indicia on said pair of arms being visible through said pair of windows.

8. The center locator tool according to claim 1, wherein said center locator tool is made from metal.

9. A center locator tool for locating the center of a workpiece, comprising:
   a) a rectangular case having a top wall, a bottom wall, and two opposing side walls;
   b) a pair of flat, rectangular arms slidable through said case, each arm having an edge and a slot defined in the edge, and having a first end and a second end, the first end having a raised stop extending transversely across the arm for preventing the arm from sliding through said case, each arm further having a bottom surface and a guide slot defined in the bottom surface extending longitudinally for the length of the arm;
   c) work engaging means disposed at the second end of each of said arms for engaging a workpiece;
   d) a center post having a bore defined therein attached to the center of the bottom wall of said case and extending between the bottom wall and the top wall of the case, the center post being internally threaded and externally threaded about an upper portion;
   e) a wheel rotatably disposed about said center post, the wheel having an O-ring about its circumference, the O-ring frictionally engaging the slots defined in said pair of arms, said arms being disposed in parallel spaced relation on opposite sides of the wheel, so that when one of said arms is slidably extended through said case, the other said arm is slidably extended through said case in the opposite direction for an equal distance; and
   f) a thumbwheel having a bore defined axially therein, the thumbwheel being internally threaded and threadably engaging said center post, the bore defined in the thumbwheel being axially aligned with the bore defined in said center post, the thumbwheel being adapted for Locking said pair of arms in a fixed position; and
   g) a pair of guide ridges projecting from the bottom wall of said case and extending transversely across the width of said case in parallel spaced relation on opposite sides of said center post, the guide ridges slidably engaging the guide slots in order to ensure said arms move rectilinearly without also moving laterally when they are extended through said case.

10. The center locator tool according to claim 9, further comprising a center punch removably engaging the bore defined in said center post.

11. The center locator tool according to claim 10, wherein said center punch comprises:
   a) a tubular case having a base and having an annular flange disposed inside the tubular case at the base of the tubular case;
   b) a punch bar having an annular flange about its circumference and a pointed tip end;
   c) a helical spring disposed about said punch bar between the annular flange of said case and the annular flange of said punch bar, the spring biasing said punch bar in a normally up position;
   d) a cap threadably engaging said tubular case;
   e) a striker having a stem inserted through said cap, the striker being disposed within said tubular case above the punch bar; and
   f) a striker plate attached to the stem of said striker.

12. The center locator tool according to claim 9, wherein said work engaging means comprises:
   a) a work engaging plate integral with the second end of each of said arms, the work engaging plates extending perpendicular to said arms and depending from said arms so that the work engaging plates are disposed in a horizontal plane parallel to the plane of said arms, each work engaging plate having an inner edge facing said case and having an outer edge;
   b) a notch defined in the outer edge of each of said work engaging plates, the notches being adapted for receiving the nib of a pen;
   c) a V-shaped recess defined in the inner edge of each of said working plates, the open mouth of the V-shaped recess facing said case and being symmetrical about a center line extending longitudinally through the center of said center locator tool, the V-shaped recess measuring 90° and being adapted for engaging a corner of a square workpiece and being adapted for engaging an arc of a circular workpiece.

13. The center locator tool according to claim 12, further comprising a wedge attachment having a triangular shape removably attached to each of said work engaging plates, two sides of the wedge attachment abutting the V-shaped recess defined in the inner edge of said work engaging plate, the third side extending across the open mouth of the V-shaped recess and having a notch defined therein, the notch bisecting the third side of the wedge attachment, the notch being adapted for engaging a corner of square and rectangular workpieces.

14. The center locator tool according to claim 12, further comprising an extension adapter for measuring workpieces smaller than about one and one-half inches being removably attached to each of said work engaging plates, the adapter including a plate supported by a pair of struts, the plate having a notch defined therein adapted for engaging a corner of square and rectangular workpieces, the struts extending the plate from the inner edge of the work engaging plates towards the center of the tool in order to engage workpieces having diameters and diagonals between about one-half inch to about one and one-half inches.

15. The center locator tool according to claim 12, wherein:
   a) one of said arms includes indicia stamped thereon corresponding to the length of a workpiece measured from the outer edge of one of said arms to the outer edge of the other said arm, the other said arm having indicia stamped thereon corresponding to the length of a workpiece measured from the inner edge of one of said arms to the inner edge of the other said arm; and
   b) said case has a pair of windows, each window having an associated pointer and indicia stamped on said case, the indicia on said pair of arms being visible through said pair of windows.

16. The center locator tool according to claim 9, wherein said center locator tool is made from metal.

17. The center locator tool according to claim 9, wherein said center locator tool is made from plastic.

* * * * *